May 13, 1930. F. C. CAVE 1,758,353
TIRE STRUCTURE
Filed Aug. 2, 1926
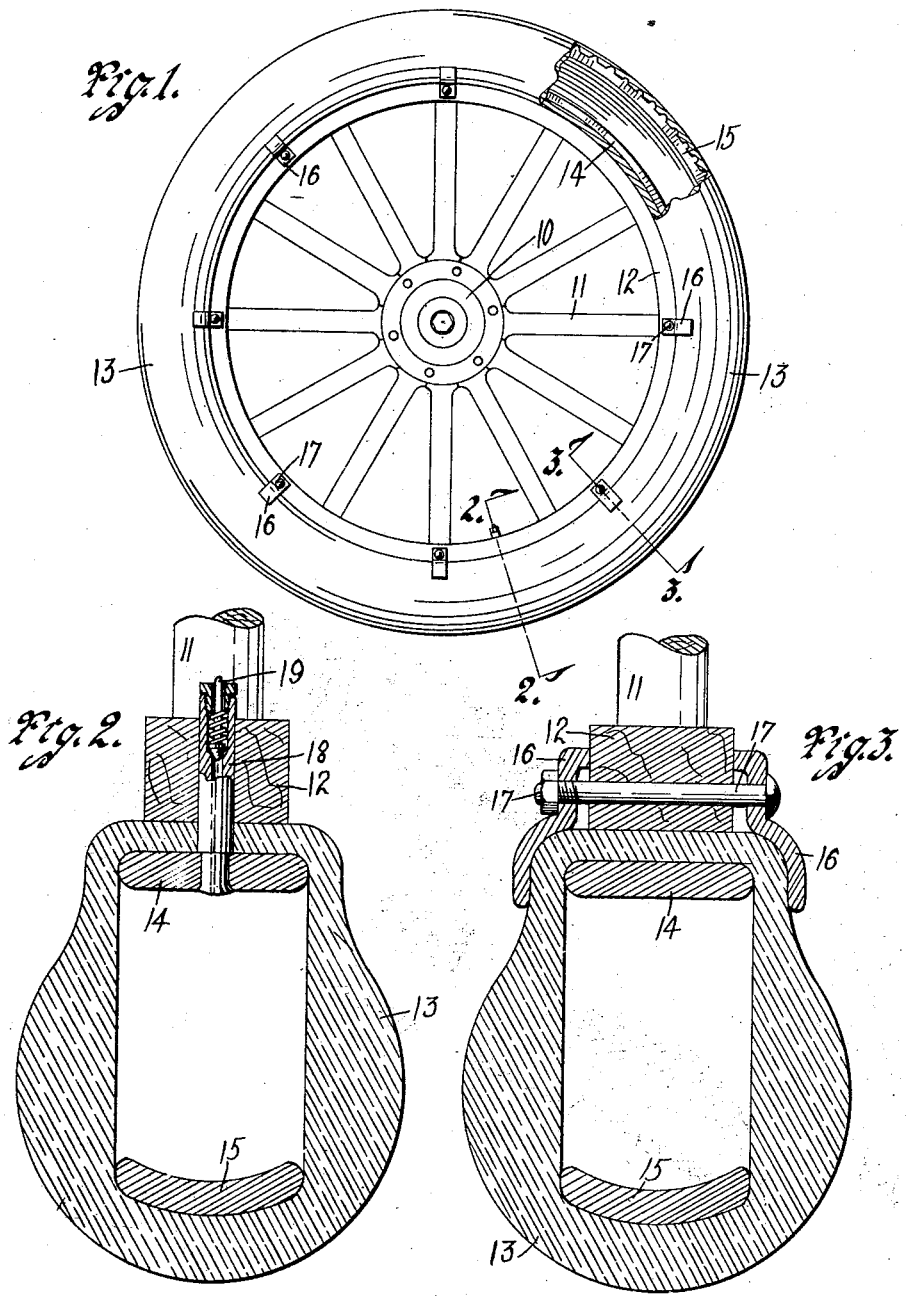
Witness
L. F. Sandberg
Inventor
Fred C. Cave
by Bair & Freeman Attorneys Patented May 13, 1930

1,758,353

UNITED STATES PATENT OFFICE

FRED C. CAVE, OF DES MOINES, IOWA

TIRE STRUCTURE

Application filed August 2, 1926. Serial No. 126,424.

The object of my invention is to provide a tire structure of simple, durable and inexpensive construction.

More particularly, it is my purpose to provide a tire structure comprising a tubular, resilient casing having received therein spaced concentric rings, which device is adapted to be mounted on an ordinary automobile wheel.

It is my purpose in this connection to provide a casing or tire of the kind mentioned having adequate resiliency, which will eliminate the inconveniences inherent in pneumatic tires by affording a structure which will not in any way be seriously affected by ordinary punctures.

With these and other objects in view, my invention consists in the construction, arrangement and combination of the various parts of my tire structure, whereby the objects contemplated are attained, as hereinafter more fully set forth, pointed out in my claim, and illustrated in the accompanying drawings, in which:

Figure 1 shows a side elevation partly broken away and in section of a wheel equipped with a tire embodying my invention.

Figure 2 is a detail, sectional view taken on the line 2—2 of Figure 1; and

Figure 3 is a similar view taken on the line 3—3 of Figure 1.

In the drawings herewith, by which I have illustrated a form in which my invention may be embodied, I have shown the tire assembled in connection with an automobile wheel, having the hub, indicated by the reference numeral 10, spokes 11 and the felly 12.

My improved tire comprises a tubular casing indicated generally by the reference numeral 13, having an outside shape substantially similar to the shape of pneumatic tires now commonly in use.

This casing is made of elastic material and is provided on the inside with two concentrically spaced rings 14 and 15.

The outer ring 15 is somewhat slightly curved from side to side, as shown in Figure 2.

The tire may be mounted on the wheel by means of a rim or the rim may be dispensed with and the tire may be mounted on the felly 12 by means of lugs 16 secured to the felly by bolts 17.

The ring 14 will give sufficient support to the inner part of the tire, so that the lugs will hold it in place on the wheel.

I preferably provide the tire with the ordinary projecting valve casing 18 and the automatically closing valve 19, so that if desired air may be forced into it.

It is my purpose to use the tire without pneumatic pressure, but I have thus provided means whereby the pressure may be controlled, if it is desirable to use it.

It will be noted that the valve as shown may serve as a relief valve to retain certain air pressure in the tire, but to let out excess pressure.

The valve casing 18 projects through the ring 14 and through the casing 13, as shown in Figure 2, and is intended to be projected through a suitable opening in the felly 12.

The advantages of a tire of this kind will be largely understood from the foregoing description.

The resiliency of the rubber will tend to hold the rings 14 and 15 equi-distantly spaced from each other. When a load is imposed on the tire, however, the rings will tend to assume a non-concentric position, so as to afford a properly resilient tire for a motor vehicle or the like.

This resiliency will, of course, be maintained and the tire will be free from the inconveniences and troubles arising from punctures to which ordinary pneumatic tires are subject.

A tire of this kind will be substantially cheaper to manufacture than an ordinary pneumatic tire tube.

It will be understood that the rings 14 and 15 may be made of any suitable material adapted for the purpose and that the ring 15 should be sufficiently resilient to permit the functioning of the tire as above explained.

Some changes may be made in the details of the construction and arrangement of the various parts of my tire without departing from the real spirit and purpose of my invention, and it is my intention to cover by my claim, any modified forms of structure or use of mechanical equivalents, which may be reasonably included within their scope.

I claim as my invention:

In a structure of the class described, the combination of a wheel having a felly, with a tubular annular resilient casing built around and having received therein an annular metal band having a flat cross section fitted against the inner face of the casing which faces outward and a larger annular resilient band positioned against the opposite inner face of the casing and a series of lugs, detachably secured to the felly and projecting radially outwardly beyond the inner band to engage and receive the inner portions of the casing for holding the casing on the wheel, said lugs having their inner ends bent toward and engaging the felly whereby the portions of the casing engaged by their outer ends are compressed between the inner metal band and the lugs.

Des Moines, Iowa, July 9, 1926.

FRED C. CAVE.